(12) United States Patent
Duerr et al.

(10) Patent No.: US 6,698,193 B2
(45) Date of Patent: Mar. 2, 2004

(54) EXHAUST GAS CLEANING SYSTEM FOR AN INTERNAL COMBUSTION ENGINE, FOR A MOTOR VEHICLE

(75) Inventors: Gerd Duerr, Neustadt-Hambach (DE); Joachim Karwath, Waiblingen (DE); Gerd Tiefenbacher, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/234,836

(22) Filed: Sep. 5, 2002

(65) Prior Publication Data

US 2003/0061806 A1 Apr. 3, 2003

(30) Foreign Application Priority Data

Sep. 6, 2001 (DE) .......................................... 101 43 806

(51) Int. Cl.$^7$ ................................................ F01N 3/10
(52) U.S. Cl. ............................ 60/302; 60/274; 60/299; 60/324; 422/176
(58) Field of Search .......................... 60/274, 299, 300, 60/302, 311, 322, 324; 422/176, 180

(56) References Cited

U.S. PATENT DOCUMENTS

| | | | | |
|---|---|---|---|---|
| 3,852,042 A | * | 12/1974 | Wagner | ........................ 60/299 |
| 3,860,403 A | * | 1/1975 | Aoi | ............................... 60/311 |
| 3,958,950 A | * | 5/1976 | DePalma | ....................... 60/299 |
| 4,004,887 A | * | 1/1977 | Stormont | ...................... 60/299 |
| 4,050,903 A | * | 9/1977 | Bailey et al. | ................... 60/299 |
| 4,209,493 A | * | 6/1980 | Olson | ........................... 422/176 |
| 4,328,188 A | * | 5/1982 | Kawata | ....................... 422/176 |
| 5,065,576 A | * | 11/1991 | Kanazawa et al. | ............ 60/299 |
| 5,177,961 A | * | 1/1993 | Whittenberger | ............. 422/176 |
| 5,339,629 A | | 8/1994 | Winberg et al. | .............. 60/299 |

FOREIGN PATENT DOCUMENTS

| | | |
|---|---|---|
| DE | 31 20 212 | 12/1982 |
| DE | 39 33 925 | 4/1991 |
| DE | 44 07 088 | 9/1994 |
| DE | 196 44 498 | 4/1998 |

* cited by examiner

Primary Examiner—Thomas Denion
Assistant Examiner—Tu M. Nguyen
(74) Attorney, Agent, or Firm—Crowell & Moring LLP

(57) ABSTRACT

An exhaust gas cleaning system for an internal combustion engine for a motor vehicle has a catalytic converter housing with an associated exhaust catalytic converter and an inlet opening for connecting an exhaust pipe. A throttle element is arranged in the catalytic converter housing, in such a manner that a first reaction chamber, which lies between the throttle element and the inlet opening, and a second reaction chamber, which lies between throttle element and exhaust catalytic converter, are formed by the throttle element.

22 Claims, 1 Drawing Sheet

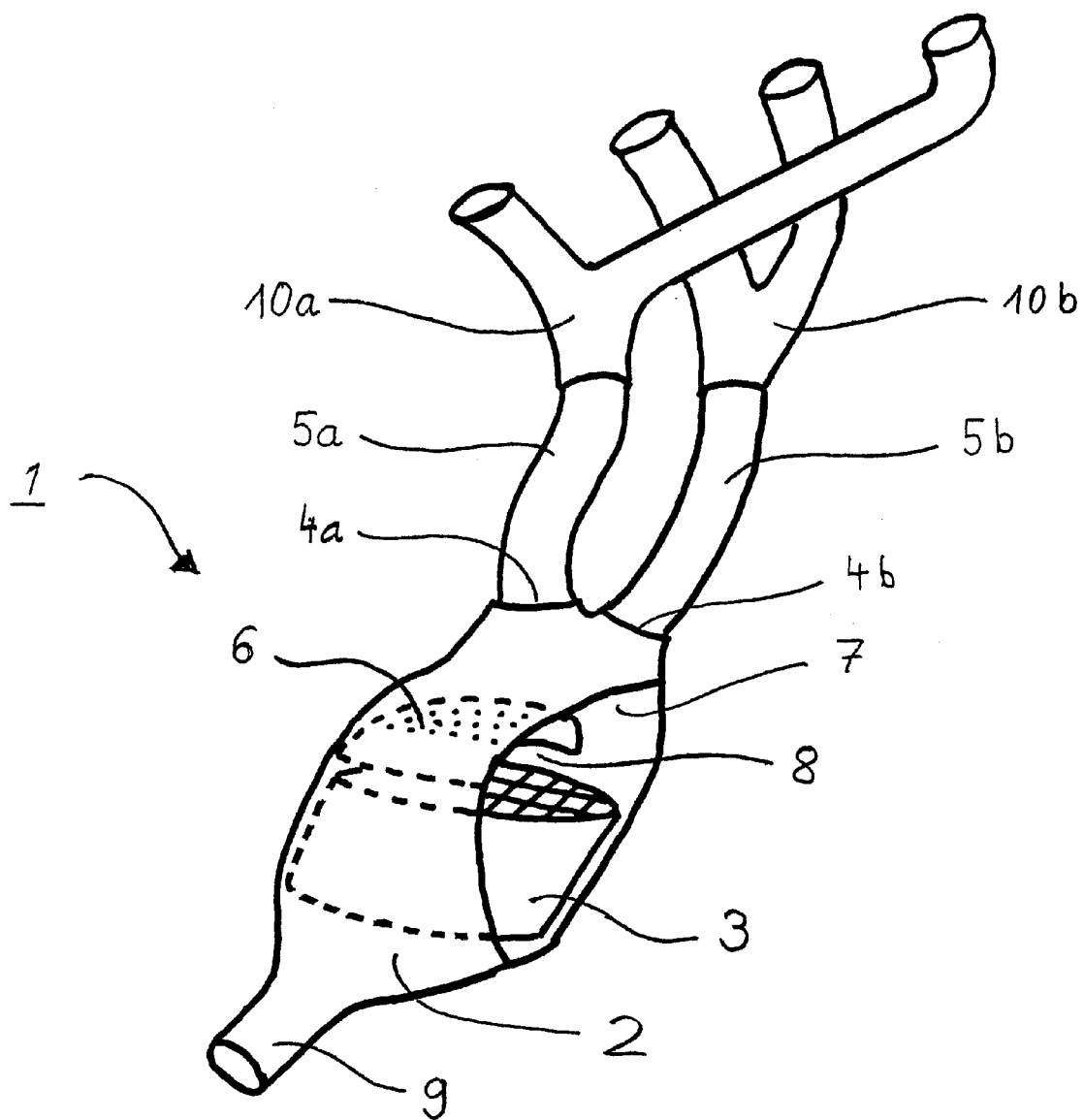

EXHAUST GAS CLEANING SYSTEM FOR AN INTERNAL COMBUSTION ENGINE, FOR A MOTOR VEHICLE

BACKGROUND AND SUMMARY OF THE INVENTION

This application claims the priority of German Application No.: 101 43 806.0-13 filed Sep. 6, 2001, the disclosure of which is expressly incorporated by reference herein.

The present invention relates to an exhaust-gas cleaning system for an internal combustion engine, in particular for a motor vehicle, having a catalytic converter housing with an associated exhaust catalytic converter and an inlet opening for connecting an exhasut pipe.

The published specification German Patent document DE 31 20 212 A1 has disclosed a device through which gas flows and which has an inlet funnel with indentations lying opposite one another. The indentations are used to make the flow more uniform or to achieve a desired flow distribution over the gas inlet cross section without significant losses occurring. Filters or catalytic treatment devices, otherwise known as exhaust catalytic converters, are primarily suitable as the device through which gas flows. In addition, a very wide range of diffusers are known and are likewise used to make gas flows more uniform while avoiding a significant pressure drop.

Exhaust catalytic converters in motor vehicles are on the one hand exposed to particular thermal and mechanical loads, especially when they are fitted close to the engine, but on the other hand are to have a high activity even during unfavorable operating conditions on the part of the engine, for example at low exhaust-gas temperatures. Particularly in the event of a high load, the engine exhaust gases are at a high temperature and may cause undesirable catalyst ageing. Moreover, under these conditions the engine exhaust gases contain incompletely burnt constituents, on account of mixture enrichment, and a certain residual oxygen content, on account of incomplete combustion. Therefore, the result is a reactivity of the exhaust gas, which can lead to further exothermic reactions taking place in the catalytic converter, in particular in its entry region. The associated release of heat makes the thermal load on the catalytic converter more intense and can cause its destruction. If exhaust catalytic converters are installed close to the engine, in the event of high gas velocities they are furthermore subjected to mechanical loads from gas surges. These gas surges result from load changes in the engine and have an erosive and abrasive effect on the catalytic coating of the exhaust catalytic converter, which likewise reduces its service life. Moreover, for a good action under unfavorable operating conditions, for example in the event of an engine cold start or when the engine is warming up, a high level of catalytic converter activity is required, and consequently optimum catalyst utilization and/or uniform distribution of the exhaust-gas flow over the catalytic converter inlet surface needs to be ensured.

It is an object of the invention to provide an exhaust-gas cleaning system which allows improved and more reliable operation of the associated catalytic converter.

According to the invention, this object is achieved by an exhaust-cleaning system for an internal combustion engine, in particular for a motor vehicle, having a catalytic converter housing with associated exhaust catalytic converter and an inlet opening for connecting an exhaust pipe, wherein a throttle element is arranged in the catalytic converter housing, in such a manner that a first reaction chamber, which lies between the throttle element and the inlet opening, and a second reaction chamber, which lies between the throttle element and the exhaust catalytic converter, are formed by the throttle element.

According to certain preferred embodiments of the invention, a throttle element is arranged in the catalytic converter housing of the exhaust-gas cleaning system, in such a manner that a first reaction chamber, which lies between a throttle element and inlet opening of the catalytic converter housing, and a second reaction chamber, which lies between the throttle element and the exhaust catalytic converter, are formed by the throttle element. Further reactions of incompletely burnt fuel constituents with residual oxygen contents in the exhaust gas may take place in these reaction chambers. Unlike with a diffuser, the throttle element on the one hand causes a certain build-up of the gas stream upstream of the throttle element in the first reaction chamber, and on the other hand mixing and swirling of the gas stream is effected downstream in the second reaction chamber.

In one configuration of preferred embodiments of the invention, the throttle element is designed as a diaphragm with a uniform perforation. This design of the throttle element results in uniform mixing of the exhaust gas in the second reaction chamber, which improves the way in which the subsequent reactions take place, and effects a uniform distribution of the gas flow over the catalytic converter entry surface and produces uniform absorption of gas surges.

In a further configuration of preferred embodiments of the invention, the throttle element has a wall which is curved oppositely to the direction of flow. This firstly results in increased mechanical stability and secondly allows the thermal expansions, which are inevitable as a result of the temperature load, to be dealt with in an advantageous way.

In a further configuration of preferred embodiments of the invention, the throttle element is designed as a perforated metal sheet comprising high-temperature resistant and/or catalytically active metal. Designing the throttle element as a perforated metal sheet is particularly advantageous for manufacturing technology reasons. On account of the high thermal load on the catalytic converter housing which is fitted mainly in the region close to the engine, the perforated metal sheet is produced, for example, from a high-alloy steel. High-alloy steels often have catalytic properties, so that subsequent reactions at the surface of the perforated metal sheet are promoted. A suitable choice of the metal material allows advantageous utilization of its catalytic properties.

In a further configuration of preferred embodiments of the invention, the throttle element is designed as a thermal shield between the inlet opening of the catalytic converter housing and the catalytic converter. On account of the separation between the first and second reaction chambers, the throttle element acts as a shield against the release of heat caused by subsequent reactions in the first reaction chamber. The heat which is released is dissipated via the throttle element to the wall of the catalytic converter housing, and moreover the direct action of thermal radiation which originates from the first reaction chamber on the catalytic converter is avoided.

Further features and combinations of features will emerge from the description and the drawing. Specific exemplary embodiments of the invention are illustrated in simplified form in the drawing and explained in more detail in the description which follows.

Other objects, advantages and novel features of the present invention will become apparent from the following detailed description of the invention when considered in conjunction with the accompanying drawings.

BRIEF DESCRIPTION OF THE DRAWING

The single drawing FIGURE is a sketch outlining an exemplary embodiment of an exhaust system constructed according to the present invention.

DETAILED DESCRIPTION OF THE DRAWING

An exhaust-gas cleaning system 1 has a catalytic converter housing 2, which is sketched partially in section in the Figure. The exhaust gases which are discharged by an internal combustion engine (not shown) are collected by two exhaust manifolds 10a, 10b and are passed onward by exhaust pipes 5a, 5b. Via the exhaust pipes, the exhaust gas is fed onward via two inlet openings 4a, 4b to the catalytic converter housing 2 and an exhaust catalytic converter 3 arranged therein. After they have flowed through the catalytic converter 3, the exhaust gases are discharged from the catalytic converter housing 2 via an outlet pipe connection piece 9.

The catalytic converter 3 is in this case designed as a honeycomb body and serves as a starting catalytic converter or primary catalytic converter in an exhaust system 1 which, downstream of this point, may also include further exhaust-gas aftertreatment devices (likewise not shown). In accordance with this function, the exhaust-gas cleaning system 1 is arranged relatively close to the engine, and consequently heat losses via the correspondingly short feed lines 10a, 10b, 5a, 5b to the catalytic converter housing 2 are low. This is important firstly in order, for example when the engine is warming up with relatively cold exhaust gas, to avoid further cooling and therefore to achieve an early response on the part of the catalytic converter 3. For the same reason, it should be ensured that the catalytic converter 3 is utilized as completely as possible, i.e. that the exhaust-gas stream is distributed as uniformly as possible over its entry surface. On the other hand, the installation of the catalytic converter close to the engine, in particular under high engine loads, entails a high thermal load. At full load, the exhaust-gas outlet temperatures may reach 1000° C. and above. However, as the thermal load increases the catalytic converter 3 or the catalytic coating is subject to increased levels of ageing phenomena. These consist, for example, in sintering with a reduction in the geometric surface area and an associated reduction in the catalytic activity. If the exhaust gas which enters the catalytic converter 3 contains reactive components, the corresponding reactions take place in the catalytic converter as further reactions. In the event of full-load enrichment of the engine, the exhaust gas contains relatively large quantities of incompletely burnt fuel constituents and/or other products of incomplete combustion. If, at the same time, the exhaust gas also contains a certain residual oxygen content, the further reactions or further combustion phenomena entail some heat being released. Given the already high thermal load on the catalytic converter 3 under the said conditions, this can cause local overheating of the catalytic converter or even complete destruction of the catalytic converter.

Moreover, at high engine loads there is a correspondingly high exhaust-gas mass flow combined, at the same time, with a high velocity and therefore a highly pulsed nature of the exhaust gas. Gas surges caused by load changes in the engine further intensify the associated mechanical load on the catalytic converter 3. If the gas surges act directly on the catalytic converter 3, erosion of the catalyst coating takes place to such an extent that it starts to be removed, leading to a corresponding loss of catalytic activity.

Therefore, according to the invention, in the catalytic converter housing 2 a throttle element 6, which is designed as a perforated metal sheet, is arranged upstream of the exhaust catalytic converter 3, as seen in the direction of flow, so that a first reaction chamber 7 and a second reaction chamber 8 are formed.

The presence of the perforated metal sheet 6 itself and the resulting formation of the reaction chambers 7, 8 create additional possibilities for the further reactions or further combustion phenomena referred to above. In the first reaction chamber 7, this is brought about by the build-up effect achieved with the aid of the perforated metal sheet 6, with a corresponding reduction in the flow velocities and an improvement to the possibilities of the exhaust-gas components coming into contact with one another.

In addition, the perforated metal sheet 6 results in swirling and mixing of the exhaust gas in the second reaction chamber 8 as a result of flow components becoming detached at the perforation, which acts in the manner of a diaphragm. This promotes further reactions in the second reaction chamber 8. Finally, the perforated metal sheet itself has a thermal shielding action and at the same time improves dissipation of heat to the catalytic converter housing 2.

The swirling and mixing of the exhaust gas in the second reaction chamber 8, brought about by the perforated metal sheet 6, also leads to a uniform distribution of the exhaust-gas stream over the surface of the catalytic converter 3 being achieved.

Therefore, the perforated metal sheet 6 arranged upstream of the catalytic converter 3, as seen in the direction of flow, not only compensates for an uneven distribution of the exhaust-gas flow which is present in the entry region of the catalytic converter housing 2, but also, in addition, acts as a shield against pulsating gas surges, which would otherwise arise without any deceleration, directed onto the surface of the catalytic converter 3.

The abovementioned effects of the perforated metal sheet 6 are advantageously achieved if this sheet has a wall or surface which is curved slightly in the opposite direction to the direction of flow of the gas, with a uniform perforation. On the one hand, this design is advantageous with regard to flow, and on the other hand it allows favorable absorption of thermal stresses or thermal expansions. In addition, this design makes a general contribution to increasing the mechanical stability. The holes which form the perforation are preferably round, but may also be in slot form, oval or of any other shape which is favorable in terms of flow and allows the abovementioned effects to be achieved. The proportion of the total area of the perforated metal sheet which is made up by holes is expediently approximately 40% to 90%. This on the one hand results in sufficient mechanical stability and on the other hand creates a favorable effect in terms of flow.

Depending on the size of the catalytic converter housing 2 or the catalytic converter 3, the perforated metal sheet 6 is arranged at a distance of 10 mm to 100 mm upstream of the surface of the catalytic converter 3 in the housing 2 and is, for example, geometrically fixed by welding. The thickness of the material of the perforated metal sheet 6 is dependent mainly on the properties of the preferably high-temperature-resistant metal and is preferably 0.8 mm to 3.0 mm. It is preferable to use a high-alloy steel. In particular, nickel-containing steels can advantageously be used, since they often have a catalytic action. As a result, further reactions which take place in accordance with a heterogeneous mechanism are promoted at the contact surface formed by the perforated metal sheet 6. Suitable selection of the material for the perforated metal sheet 6 or additional coating of this sheet allows this effect to be additionally enhanced.

Overall, therefore, the perforated metal sheet 6 serves to achieve safer and more reliable operation of the catalytic converter 3 and therefore increases its service life. This is not only as a result of the reduction of the thermal load on the catalytic converter on account of the reaction chambers 7, 8, into which the further reactions and further combustions are shifted upstream, so that they are kept away from the catalytic converter 3. Furthermore, as has been outlined, the perforated metal sheet 6 acts as a thermal and mechanical shield. In particular the latter property reduces the abrasive and erosive loads on the catalytic converter 3.

In preferred embodiments of the invention, the perforated metal sheet 6 has circular holes therethrough having a diameter in the range of 3 mm to 15 mm. In especially preferred embodiments, this range of hole diameters is between 5 mm and 12 mm. A practical plate being used has holes with a diameter of 8 mm. Thus, based upon the indicated range of total area made up by holes as being approximately 40% to 90% of the total area of the perforated metal sheet 6, a corresponding hole density can be determined, assuming a uniform distribution of the holes over the plate surface.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Exhaust-gas cleaning system for an internal combustion engine, in particular for a motor vehicle, having a catalytic converter housing with an associated exhaust catalytic converter and an inlet opening for connecting an exhaust pipe,
    wherein the catalytic converter is a starting catalytic converter arranged close to the engine,
    wherein a throttle element is arranged in the catalytic converter housing in such a manner that a first reaction chamber, which lies between the throttle element and the inlet opening, and a second reaction chamber, which lies between throttle element and exhaust catalytic converter, are formed by the throttle element,
    wherein the throttle element has a wall which is curved opposite to the direction of flow, and
    wherein the throttle element is a perforated metal sheet with a uniform distribution of circular holes therethrough, the holes forming between 40% to 90% of the surface area of the perforated metal sheet exposed to gas flows, said holes being configured to throttle and impart swirling flow to gases passing therethrough.

2. Exhaust gas cleaning system according to claim 1, wherein the throttle element is designed as a thermal shield between the inlet opening and the catalytic converter.

3. Exhaust gas cleaning system according to claim 1, wherein the throttle element is disposed between 10 mm and 100 mm upstream of the catalytic converter.

4. Exhaust gas cleaning system according to claim 1, wherein the throttle element is at least one of a high-temperature-resistant metal and a catalytically active metal.

5. Exhaust gas cleaning system according to claim 4, wherein the throttle element is designed as a thermal shield between the inlet opening and the catalytic converter.

6. Exhaust gas cleaning system according to claim 1, wherein the holes in the throttle element have a diameter in the range of 3 mm to 15 mm.

7. Exhaust gas cleaning system according to claim 6, wherein the holes have a diameter in the range of 5 mm to 12 mm.

8. Exhaust gas cleaning system according to claim 7, wherein the holes have a diameter of 8 mm.

9. Exhaust gas cleaning system for an internal combustion engine for a vehicle comprising:
    a catalytic converter housing having an inlet for communicating in use with an engine exhaust line and an outlet opening in use to an outlet line,
    a catalytic converter disposed in said housing, wherein the catalytic converter is a starting catalytic converter arranged close to the engine, and
    a throttle element disposed in said housing upstream of said catalytic converter, said throttle element dividing said housing into first and second reaction chambers, said first reaction chamber being formed between the inlet and the throttle element and said second reaction chamber being formed between the outlet and the throttle element, said catalytic converter being disposed in the second reaction chamber,
    wherein the throttle element has a wall which is curved opposite to the direction of flow, and
    wherein the throttle element is a perforated metal sheet with a uniformed distribution of circular holes therethrough, the holes forming between 40% to 90% of the surface area of the perforated metal sheet exposed to gas flows, said holes being configured to throttle and impart swirling flow to gases passing therethrough.

10. Exhaust gas cleaning system according to claim 9, wherein the throttle element is at least one of a high-temperature-resistant metal and a catalytically active metal.

11. Exhaust gas cleaning system according to claim 9, wherein the throttle element is designed as a thermal shield between inlet opening and the catalytic converter.

12. Exhaust gas cleaning system according to claim 9, wherein the throttle element is disposed between 10 mm and 100 mm upstream of the catalytic converter.

13. Exhaust gas cleaning system according to claim 9, wherein the holes in the throttle element have a diameter in the range of 3 mm to 15 mm.

14. Exhaust gas cleaning system according to claim 9, wherein the perforated metal sheet is between 0.8 mm and 3.0 mm thick.

15. Exhaust gas cleaning system according to claim 14, wherein the perforated metal sheet is made of a high alloy nickel containing steel.

16. Exhaust gas cleaning system according to claim 15, wherein the throttle element is disposed between 10 mm and 100 mm upstream of the catalytic converter.

17. A method of making an exhaust gas cleaning system for an internal combustion engine for a vehicle comprising:
    providing a catalytic converter housing having an inlet for communicating in use with an engine exhaust line and an outlet opening in use to an outlet line,
    disposing a catalytic converter in said housing and disposing the catalytic converter close to the engine, and disposing a throttle element in said housing upstream of said catalytic converter, said throttle element dividing said housing into first and second reaction chambers, said first reaction chamber being formed between the inlet and the throttle element and said second reaction chamber being formed between the outlet and the throttle element, said catalytic converter being disposed in the second reaction chamber elements, wherein the throttle element has a wall which is curved opposite to the direction of flow, and wherein the throttle element is a perforated metal sheet with a uniformed distribution of circular holes therethrough, the holes forming between 40% to 90% of the surface area of the perforated metal sheet exposed to gas flows, said holes being configured to throttle and impart swirling flow to gases passing therethrough.

18. A method according to claim 17, wherein the throttle element is at least one of a high-temperature-resistant metal and a catalytically active metal.

19. A method according to claim 17, wherein the throttle element is designed as a thermal shield between inlet opening and the catalytic converter.

20. A method according to claim 17, wherein the throttle element is disposed between 10 mm and 100 mm upstream of the catalytic converter.

21. A method according to claim 17, wherein said perforated metal sheet is welded to inside walls of the catalytic converter housing.

22. A method according to claim 17, wherein said holes are uniformly distributed on the perforated metal sheet and each have a diameter of 3 mm to 15 mm.

\* \* \* \* \*